US010840682B2

(12) United States Patent
Tipton et al.

(10) Patent No.: US 10,840,682 B2
(45) Date of Patent: Nov. 17, 2020

(54) UNDERGROUND COMPOSITE CABLE ENCLOSURE

(71) Applicant: HUBBELL INCORPORATED, Shelton, CT (US)

(72) Inventors: Wiley Richard Tipton, Friendsville, TN (US); Michael Edward Fisher, Knoxville, TN (US); John Unger, Rocky Mount, NC (US); Ryan Hudlow, Rocky Mount, NC (US)

(73) Assignee: HUBBELL INCORPORATED, Shelton, CT (US)

( * ) Notice: Subject to any disclaimer, the term of this patent is extended or adjusted under 35 U.S.C. 154(b) by 177 days.

(21) Appl. No.: 15/566,943

(22) PCT Filed: Apr. 14, 2016

(86) PCT No.: PCT/US2016/027587
§ 371 (c)(1),
(2) Date: Oct. 16, 2017

(87) PCT Pub. No.: WO2016/168497
PCT Pub. Date: Oct. 20, 2016

(65) Prior Publication Data
US 2018/0138677 A1     May 17, 2018

Related U.S. Application Data

(60) Provisional application No. 62/147,494, filed on Apr. 14, 2015, provisional application No. 62/147,474, filed on Apr. 14, 2015.

(51) Int. Cl.
*H02G 3/04*     (2006.01)
*H02G 9/06*     (2006.01)

(52) U.S. Cl.
CPC ......... *H02G 3/0418* (2013.01); *H02G 3/0468* (2013.01); *H02G 9/06* (2013.01); *H02G 9/065* (2013.01)

(58) Field of Classification Search
CPC ...... H02G 3/0418; H02G 9/06; H02G 3/0468; H02G 9/065; H02G 3/0487; H02G 9/02; H02G 9/04
(Continued)

(56) References Cited

U.S. PATENT DOCUMENTS 308,612 A * 12/1884 Houston ............... H05K 1/0263
174/98
2,501,762 A    3/1950 Davis
(Continued)

OTHER PUBLICATIONS

"Hubbell Power Systems—Products for Electric Utilities, Telecommunications and Construction Industries" by Hubbell, Apr. 2, 2015. [retrieved Jun. 17, 2016]; Retrieved from the Internet <URL: https://web.archive.org/web/20150402150201/https://hubbellpowersystems.com/enclosures/below-ground/straight/48x96/pg-quazite.asp>; figure 1, p. 1.
(Continued)

*Primary Examiner* — Ernesto A Grano
(74) *Attorney, Agent, or Firm* — Dilworth IP, LLC

(57) ABSTRACT

The present disclosure provides an underground cable enclosure having a body made of a composite material, and a cover assembly having at least one cover rail that is made of polymer cement and molded to at least a portion of the body, and at least one cover that is made of polymer cement and can rest on the at least one cover rail.

20 Claims, 9 Drawing Sheets

(58) Field of Classification Search
USPC ........................................................ 220/484
See application file for complete search history.

(56) References Cited

U.S. PATENT DOCUMENTS

| | | | | |
|---|---|---|---|---|
| 3,778,941 | A | | 12/1973 | Dorris |
| 3,858,614 | A | * | 1/1975 | Moore .................... F16L 57/00 138/105 |
| 4,124,324 | A | * | 11/1978 | Augis .................... H02G 9/065 404/25 |
| 4,578,913 | A | | 4/1986 | Eich |
| 4,961,293 | A | * | 10/1990 | House .................... B65D 88/76 52/21 |
| 5,471,811 | A | * | 12/1995 | House .................... E01F 8/0011 256/13.1 |
| 5,709,249 | A | * | 1/1998 | Okada ................... H02G 3/0418 138/162 |
| 6,061,975 | A | | 5/2000 | Craft |
| 6,305,601 | B1 | * | 10/2001 | Bazany ................ B65D 5/0055 229/198.1 |
| 7,365,269 | B2 | * | 4/2008 | Donazzi .................... H02G 9/02 174/84 R |
| 7,622,669 | B2 | * | 11/2009 | Donazzi ................. H02G 9/065 174/36 |
| 2003/0016931 | A1 | * | 1/2003 | Ferris ................... G02B 6/4459 385/134 |
| 2004/0258385 | A1 | * | 12/2004 | Kadrnoska ........... G02B 6/4459 385/136 |
| 2005/0000723 | A1 | * | 1/2005 | Fox ....................... H02G 3/0418 174/95 |
| 2005/0223658 | A1 | | 10/2005 | Reed |
| 2006/0104010 | A1 | * | 5/2006 | Donazzi ................... H02G 9/02 361/600 |
| 2007/0144754 | A1 | * | 6/2007 | Donazzi ................... H02G 9/04 174/34 |
| 2011/0095140 | A1 | * | 4/2011 | Armit ..................... E03B 7/095 248/68.1 |
| 2013/0125720 | A1 | * | 5/2013 | Allen ...................... H02G 1/08 83/27 |
| 2013/0181487 | A1 | | 7/2013 | Krueger et al. |
| 2014/0097219 | A1 | | 4/2014 | Reiber |
| 2017/0149228 | A1 | * | 5/2017 | Pawluk ................ H02G 3/0437 |
| 2017/0299090 | A1 | * | 10/2017 | Pearson .................... F16L 9/20 |
| 2019/0013654 | A1 | * | 1/2019 | Suenaga ............... H02G 3/0487 |

OTHER PUBLICATIONS

"New Armorcast" by Armorcast Products Company, Aug. 2014. [retrieved Jun. 17, 2016]; Retrieved from the Internet <URL: http://armorcastprod.com/downloads/New-Armorcast-2014-11-12.pdf>; figures 1 & 2, pp. 54-55.

PCT International Search Report and Written Opinion dated Jul. 26, 2016 from corresponding Application No. PCT/US16/27587, 9 pages.

* cited by examiner

UNDERGROUND COMPOSITE CABLE ENCLOSURE

CROSS-REFERENCE TO RELATED APPLICATIONS

This application claims priority to U.S. Provisional Application No. 62/147,494, filed on Apr. 14, 2015, titled "Underground Composite Cable Enclosure," and U.S. Provisional Application No. 62/147,474, filed on Apr. 14, 2015, titled "Modular Underground Plastic Cable Enclosure," both of which are hereby incorporated herein by reference in their entireties.

BACKGROUND

Field

The present disclosure relates generally to underground cable enclosures. More particularly, the present disclosure relates to underground composite cable enclosures used to contain and protect cabling within the enclosure, while providing immediate access to the cabling located within the enclosure.

Description of the Related Art

It has become a fairly widespread practice to bury power, control, signal, coaxial, communication and fiber optic cables in underground lined trenches adjacent the ground surface to transfer power and/or signals between end points within, for example, power generating stations and substations, railroad stations and junctions, chemical and oil refineries, wireless communication transmission stations, and other industrial environments. Such lined trenches include duct banks, cable trays, and cement troughs. Cement troughs are typically pre-casted in lengths of 10 feet or more and shipped to the field for installation. After installation of the cement trough and cabling, smaller cement covers are positioned on ledges in the cement trough to enclose the cabling. The cement covers are typically at ground level, and when laid end to end in an abutting relation along the ledges form an enclosure. To service cables within the trough or add new cables to the trough, one or more covers can be removed to provide access to the area needed. The concrete troughs of the type described above function relatively well, but are extremely heavy necessitating the use of heavy equipment to install the troughs. The use of heavy equipment increases the cost in install the cement troughs, the time it takes to install the cement troughs, and the risk of injury when installing such troughs.

SUMMARY

The present disclosure provides underground cable enclosures and troughs used to contain and protect cabling, such as power, control, signal, coaxial, communication and fiber optic cables, in subterranean locations while permitting immediate access to the cables located within the enclosure or trough. The enclosures and troughs contemplated by the present disclosure are partially made of a lightweight composite material to reduce the weight of the enclosure or trough.

In one embodiment, the underground cable enclosure includes a body made of a composite material and a cover assembly. The cover assembly has at least one cover rail molded to at least a portion of the body and at least one cover that can rest on the at least one cover rail. Preferably, the at least one cover rail and the at least one cover are made of polymer concrete. The cover assembly may also include at least one cover strut that can extend across the body so that the at least one cover can rest on the at least one cover strut. The body according to this exemplary embodiment includes a base made of a composite material, a first sidewall made of a composite material and extending from the base, and a second sidewall made of a composite material and extending from the base.

In one embodiment, the underground cable trough includes a base made of a composite material, a first sidewall extending from the base and made of a composite material, a first cover rail made of polymer cement and attached to a top portion of the first sidewall, a second sidewall extending from the base and made of a composite material, and a second cover rail made of polymer cement and attached to a top portion of the second sidewall. The underground cable trough may also include at least one cover strut configured to extend from the first cover rail to the second cover rail so as to support at least one cover.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

Figure 1:
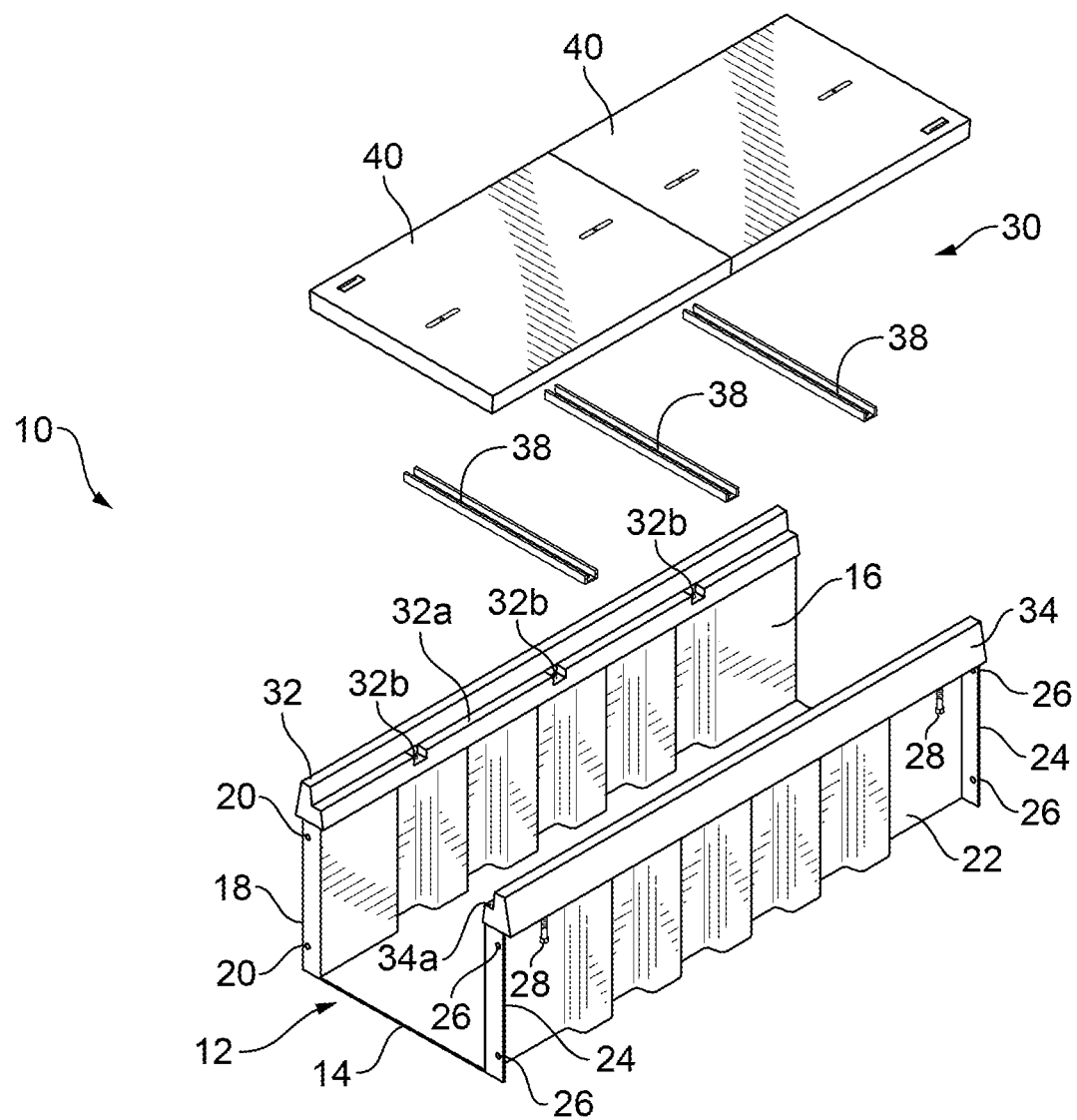
FIG. 1 is a perspective view with parts separated of an exemplary embodiment of an underground cable enclosure according to the present disclosure.

The present disclosure provides underground cable enclosures and troughs used to contain and protect cabling, such as power, control, signal, coaxial, communication and fiber optic cables, in subterranean locations while permitting immediate access to the cabling located within the enclosure or trough. In an exemplary embodiment, the underground cable enclosure 10 includes a body 12 and a cover assembly 30, seen in FIGS. 1 and 2.

The body 12 includes a base 14 and a pair of sidewalls 16 and 22. The body 12 is preferably formed as a unitary body to provide a weatherproof enclosure. In an alternative embodiment, the body can be formed of individual components (base 14, sidewall 16 and sidewall 22) that are secured together using fasteners, such as a nut and bolt, or adhesive. If desired, a body 12 formed of individual components may be weatherproofed using gaskets or silicone sealants. The body 12 can be fabricated in various shapes, such as straight, T-shaped and with 90 degree bends. For straight bodies, the length of the body may vary depending upon the environment the enclosure is to be installed. Generally, the body length can range between about 1 foot and about 10 feet. Preferably the length of the body is about 5 feet. The width of the body may vary depending upon the environment the enclosure is to be installed. Generally, the width of the body can range between about 1 foot and about 4 feet. Preferably, the width of the body is about 35 inches. The depth of the body may vary depending upon the environment the enclosure is to be installed. Generally, the depth of the body can range between about 6 inches and about 2 feet. Preferably, the depth of the body is about 16 inches.

Figure 3:
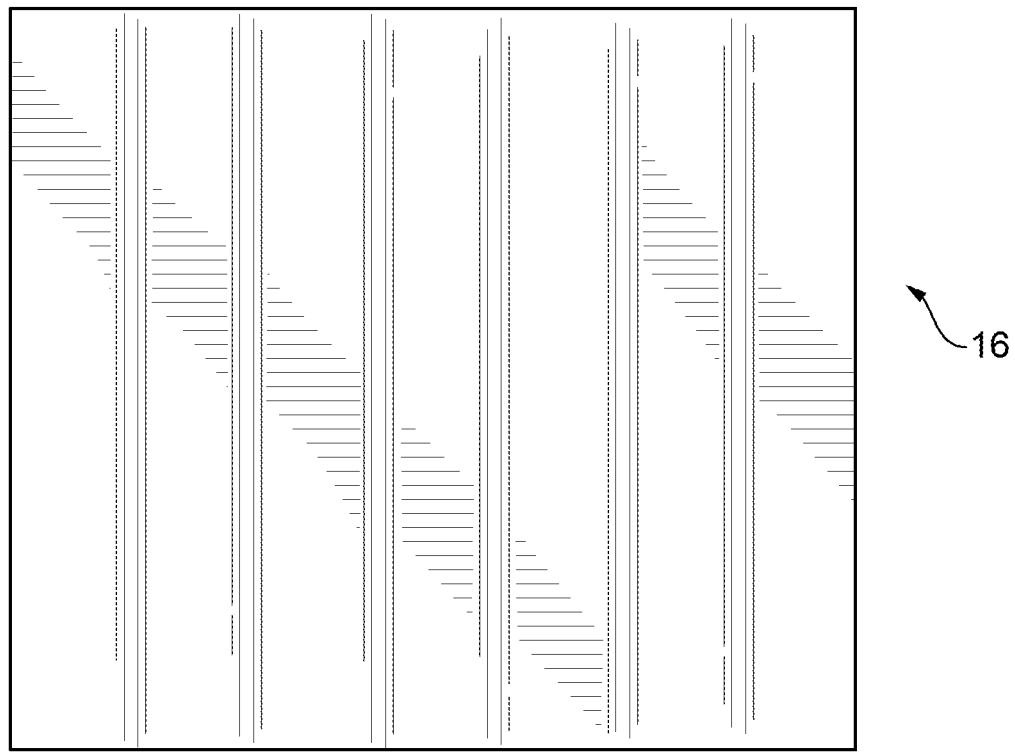
FIG. 3 is an elevation view of a portion of a side wall of the underground cable enclosure of FIG. 1, illustrating a corrugated structure of that portion of the sidewall.
Figure 4:
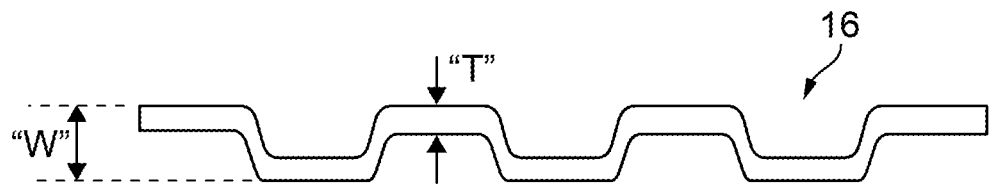
FIG. 4 is a top plan view of the portion of the side wall of the underground cable enclosure of FIG. 3.
Figure 5:
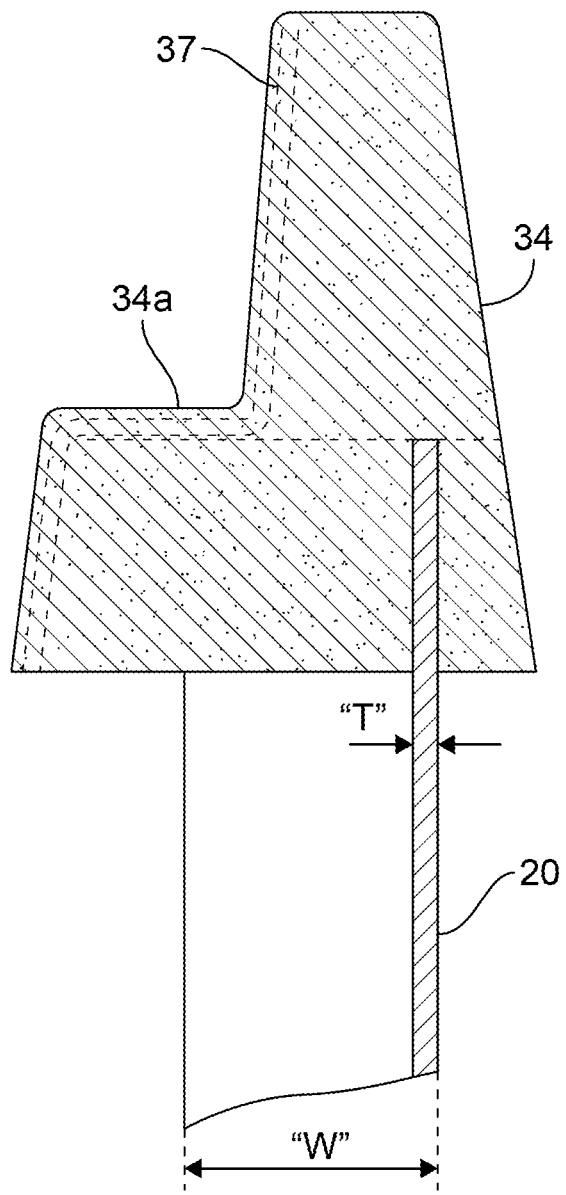
FIG. 5 is a partial cross-section of a portion of a sidewall of the underground cable enclosure of FIG. 1, illustrating a cover rail molded to a top portion of the sidewall of the enclosure.

The body 12 can be fabricated from composite materials, such as fiberglass and polyester resin, carbon fiber composites, and/or other composite materials capable of providing the structural integrity to protect cables within the enclosure 10, and to withstand loads created by individuals walking on the enclosure 10 or by vehicles riding over the enclosure 10. As an example, the body can withstand loads of at least 22,000 lbs. The sidewalls 16 and 22 of the body 12 preferably include at least a portion with a corrugated construction, seen in FIGS. 3 and 4, to provide added strength to the sidewalls. Referring to FIG. 5, the thickness "T" of each sidewall is in the range of between about 3/16" and about 1/4, and the overall width "W" of the corrugated sidewall is in the range of between about 1 7/8" and about 2". Each end of sidewall 16 includes a flange 18 that provides a flat surface to engage a flange on another enclosure, or termination point, to permit coupling a plurality of enclosures in an abutting relationship. Each end of sidewall 22 includes a flange 24 that provides a flat surface to engage a flange on another enclosure, or termination point, also to permit coupling a plurality of enclosures in an abutting relationship.

Figure 2:
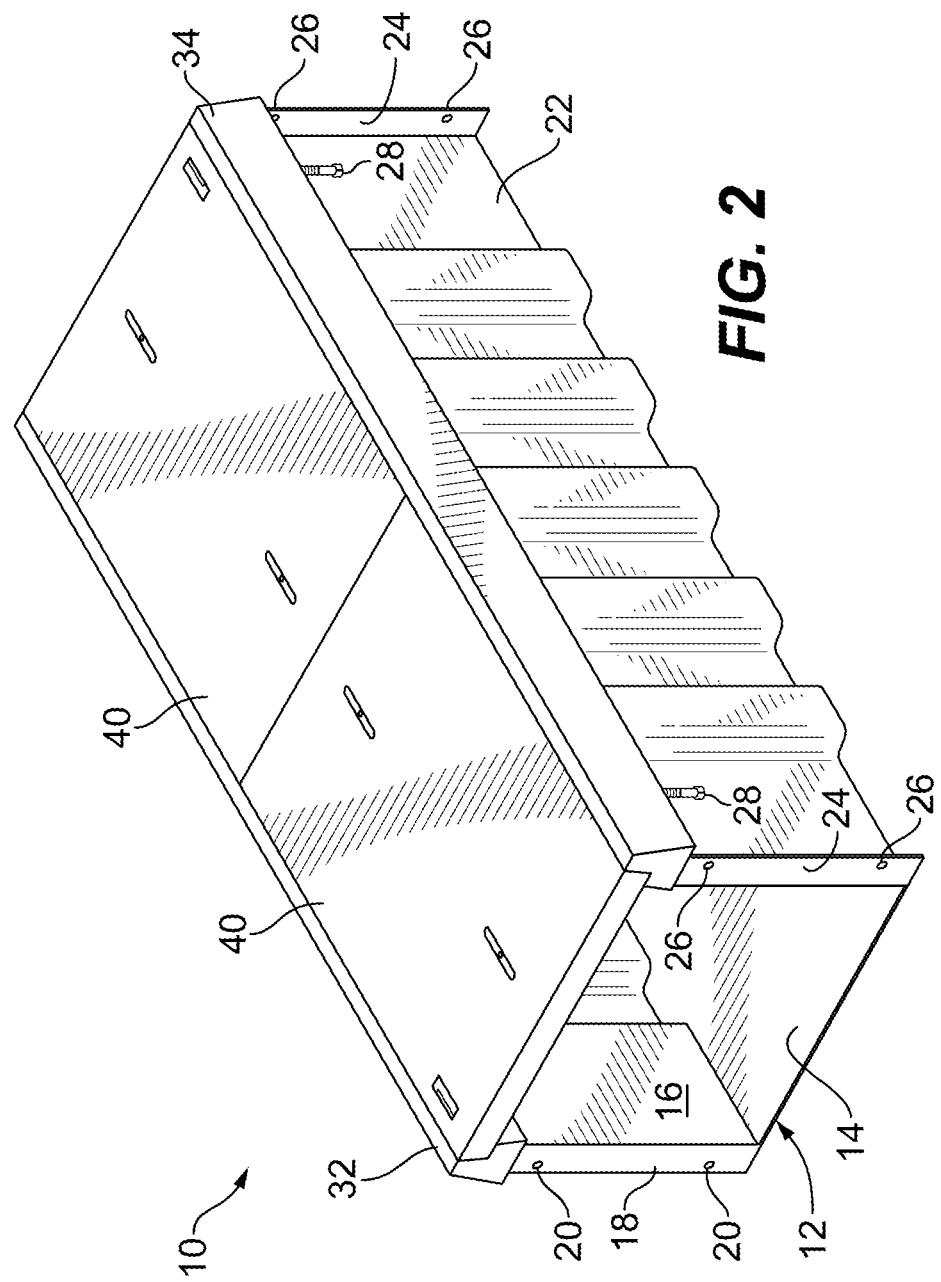
FIG. 2 is a perspective view of the underground cable enclosure of FIG. 1, illustrating two covers resting on ledges of the underground cable enclosure.

In an exemplary embodiment, the cover assembly 30 includes a pair of cover rails 32 and 34, and one or more covers 40. Cover rails 32 and 34 are configured and dimensioned to support cover 40. As such, the cover rails preferably include ledges 32a and 34a upon which the cover can rest. Cover rail 32 is molded into or otherwise secured to a top portion of sidewall 16 of body 12, and cover rail 34 is molded into or otherwise secured to a top portion of sidewall 22 of body 12, as seen in FIGS. 2 and 5. The cover rails 32 and 34 are configured to support the one or more covers 40, as seen in FIG. 2. The cover rails 32, 34 and one or more covers 40 can be made of reinforced concrete, polymer concrete, including polymer concrete sandwiched between layers of fiberglass, or other materials capable of providing the structural integrity to protect cables within the enclosure 10, and to withstand loads created by individuals walking on the enclosure 10 or by vehicles riding over the enclosure 10. Fiberglass reinforcement 37 made be embedded within each cover rail 32 and 34 to extend along an inner region of the main body of the cover rail and along the ledge to provide additional strength to the ledge 32a or 34a, as seen in FIG. 5.

Figure 6:
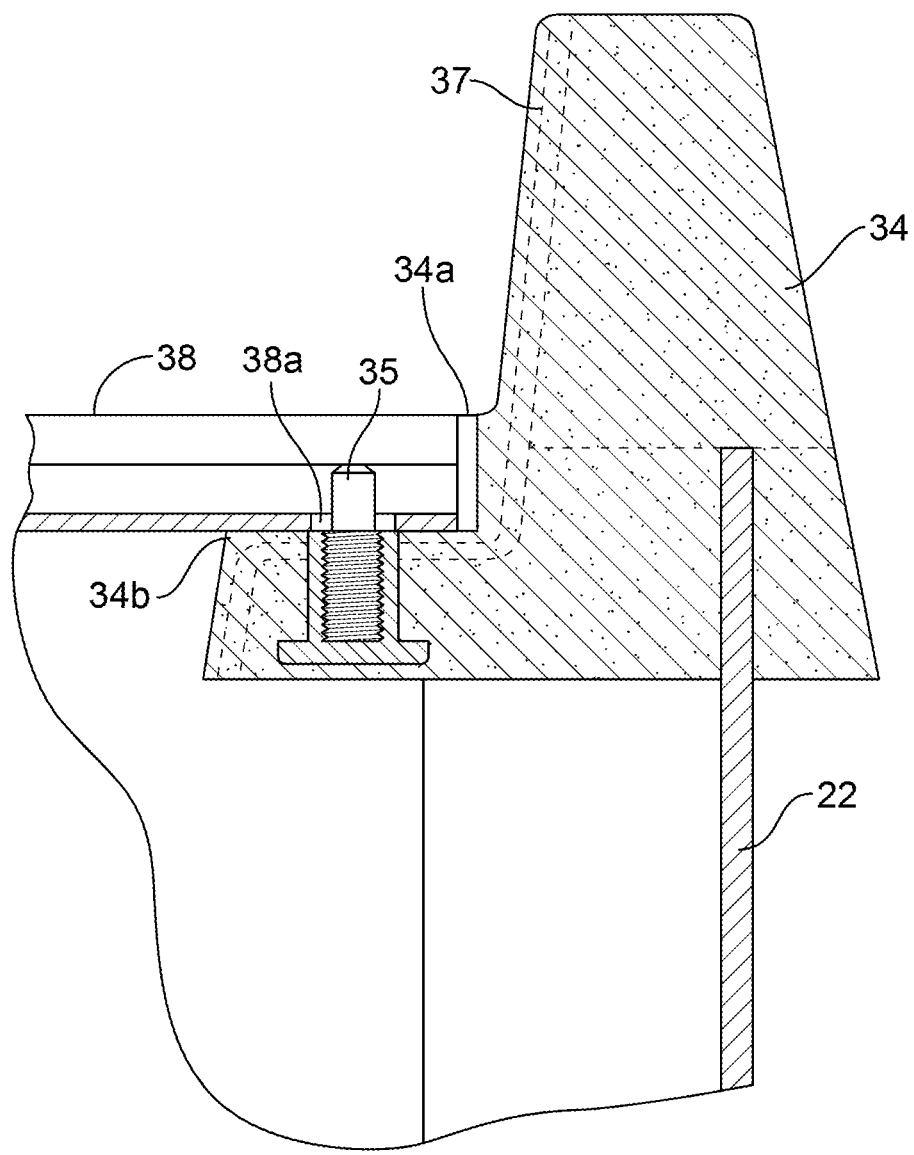
FIG. 6 is a partial cross-section of a portion of the sidewall of the underground cable enclosure of FIG. 1, illustrating a cover strut secured to a cover rail of the enclosure.

The cover assembly 30 may also include one or more cover struts 38. The cover struts 38 can be positioned within strut rests 32b in cover rail 32, and strut rests 34b (seen in FIG. 6) in cover rail 34. More specifically, each cover strut 38 is configured to extend across the body 12 from cover rail 32 on sidewall 16 to cover rail 34 on sidewall 22 so that one end of the cover strut rests within strut rest 32a and the other end of the cover strut rests within strut rest 34a. The cover struts 38 are provided to support the one or more covers 40, and can be made of steel, galvanized steel or other suitable material capable of supporting one or more covers 40 and loads applied to the covers. The cover struts 38 can also provide additional support to the sidewalls 16 and 22 of the body 12 to prevent the sidewalls from collapsing inwardly. The cover struts 38 can also provide additional support to the sidewalls 16 and 22 of the body 12 to prevent the sidewalls from spreading apart. More specifically, referring to FIG. 6, the ledge (e.g., ledge 34a) of a cover rail (e.g., cover rail 34) includes a strut rest (e.g., strut rest 34b) in which an end of the cover strut 38 rests or sits as described above. Extending from the strut rest is a pin 35 that fits within an aperture 38a in cover strut 38. The pin 35 is provided to prevent movement of the sidewall relative to the cover strut 38 to help prevent the sidewalls 16 and 22 from spreading apart as well as collapsing inward.

Figure 7:
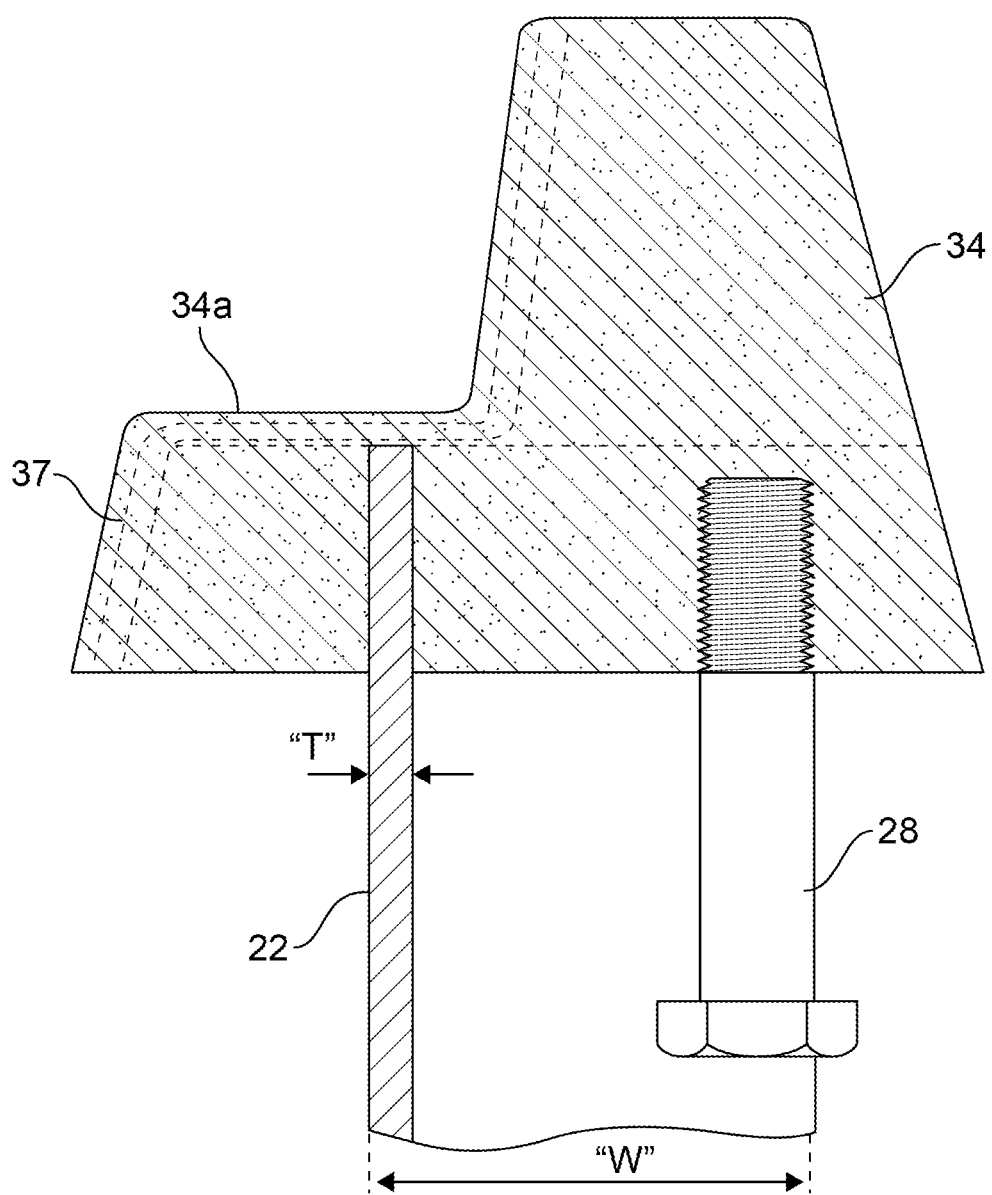
FIG. 7 is a partial cross-section of a portion of the sidewall and cover rail of the underground cable enclosure of FIG. 1, illustrating a lift arm for connecting to straps that can be used to lift the underground cable enclosure.

Referring to FIG. 7, the cover rails 32 and 34 may include one or more lift arms 28 at least partially embedded within or otherwise secured to the cover rail. The lift arm 28 permits the connecting of straps that can be used to lift the underground cable enclosure during installation.

In an exemplary embodiment, the underground cable troughs contemplated by the present disclosure includes the body 12 and the cover rails 32 and 34, seen in FIGS. 1 and 2, and described above.

Figure 8:
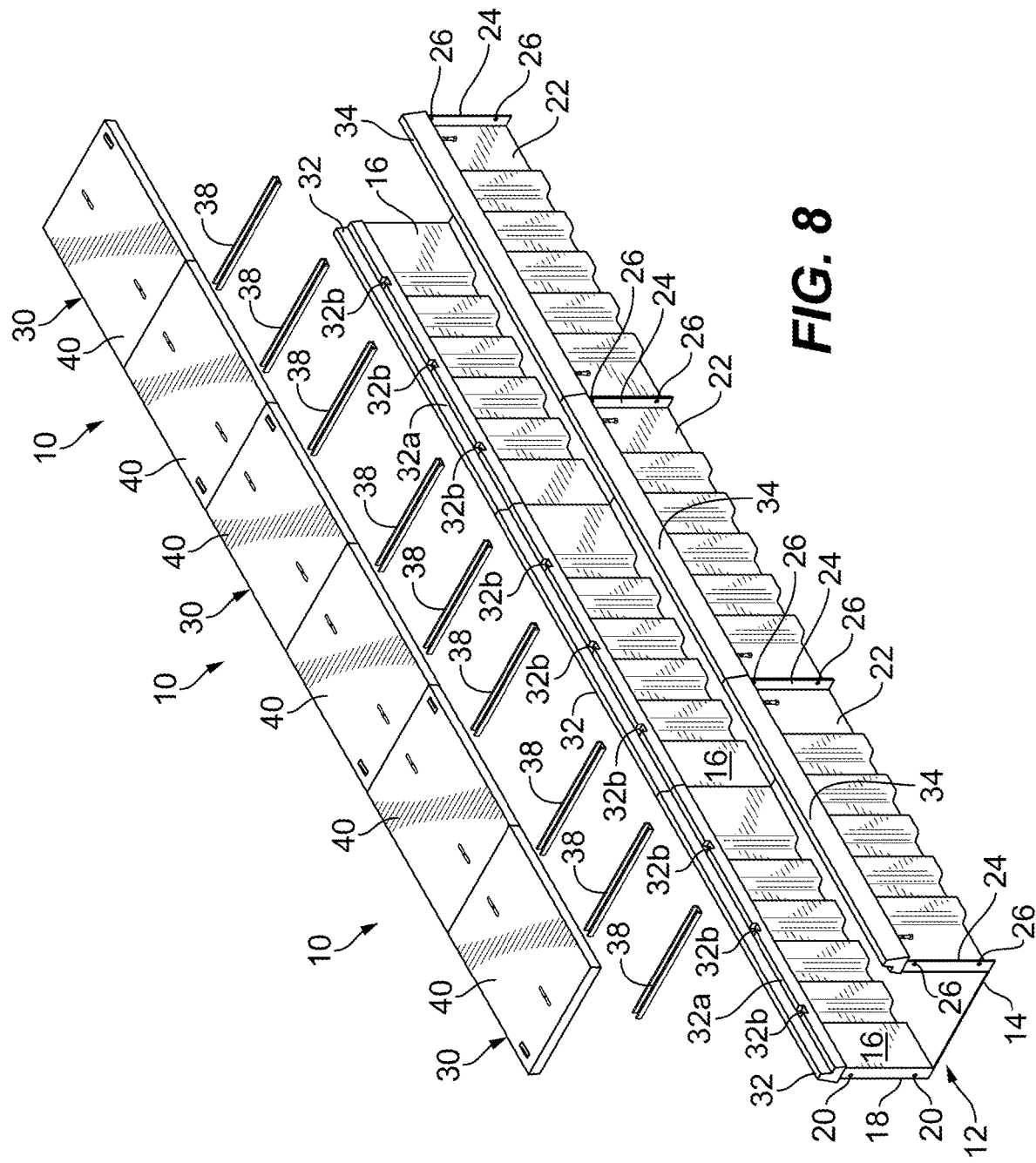
FIG. 8 is a perspective view with parts separated of a plurality of the underground cable enclosures of FIG. 1 secured in series to form an elongated cable enclosure.
Figure 9:
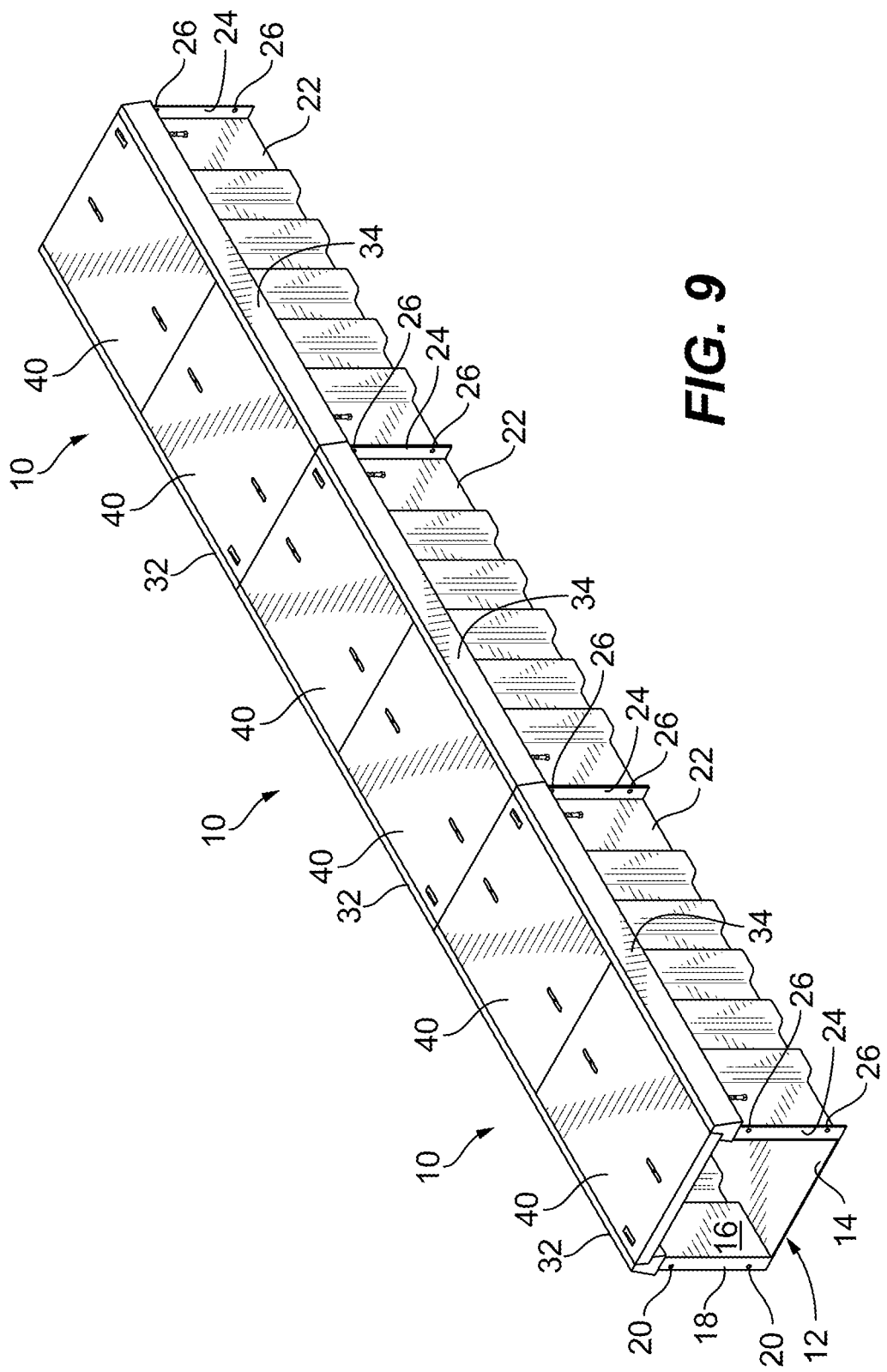
FIG. 9 is a perspective view of the underground cable enclosure of FIG. 8, illustrating covers resting on ledges of the underground cable enclosures.

Referring to FIGS. 8 and 9, to create an elongated underground enclosure, a plurality of enclosures 10 of the present disclosure can be positioned within a trench in an abutting relationship. The abutting enclosures 10 can be attached to each other using fasteners. For example, threaded nuts can be inserted through holes 20 in flange 18 of sidewall 16, and through holes 26 in flange 24 of sidewall 22. Washers and bolts can then be secured to the nuts.

To fabricate the enclosure 10, fiberglass is placed on a mold shaped to form the body 12 with a base and sidewalls. The fiberglass is then impregnated (also known as "wet out") with resin, e.g., polyester resin. The top portion of each sidewall 16 and 22 that is to be cast inside the polymer concrete cover rails 32 and 34, respectively, are designed so as to prevent the top portion of the sidewall and the cover rail from separating after being cast together by scarifying the top of the sidewalls. Once the body 12 is fabricated, the body is then placed in another mold to make the cover rails 32 and 34. As noted above, the cover rails 32 and 34 are preferably made of polymer concrete, which in this exemplary embodiment, consists of three different aggregates, e.g., rock, sand and calcium and a polyester resin. The polymer concrete is poured into the mold such that the top portion of sidewall 16 and sidewall 22 are embedded (or set) in the wet polymer concrete mix. Once the polymer concrete cures, the body and cover rails are removed from the mold, and cleaned for shipment.

Figure 10:
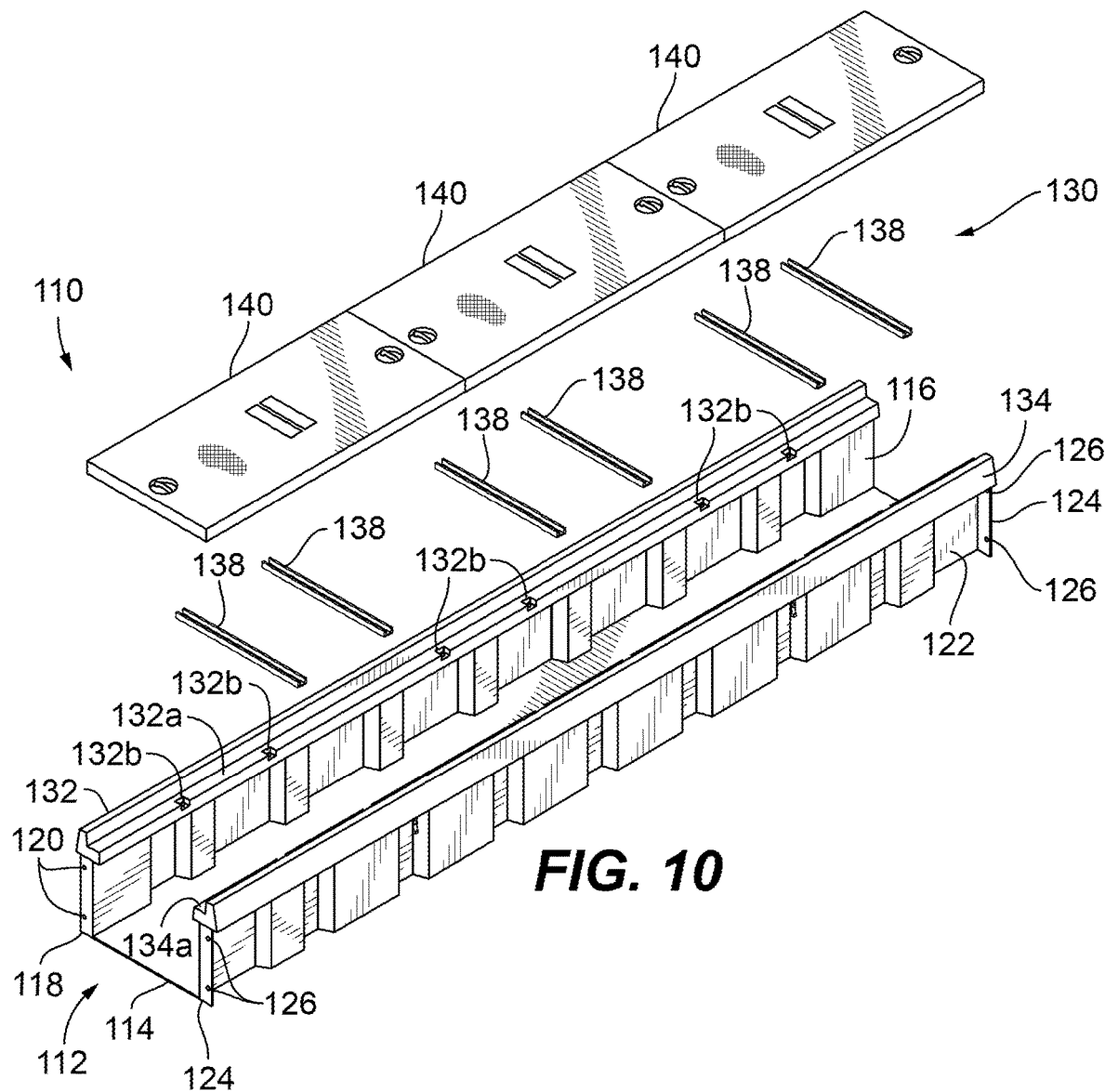
FIG. 10 is a perspective view with parts separated of another embodiment of the underground cable enclosure according to the present disclosure.

FIG. 10 is a perspective view with parts separated of another embodiment of the underground cable enclosure according to the present disclosure. The body 112 includes a base 114 and a pair of sidewalls 116 and 122. The body 112 is preferably formed as a unitary body to provide a weatherproof enclosure. In another alternative embodiment, the body can be formed of individual components (base 114, sidewall 116 and sidewall 122) that are secured together using fasteners, such as a nut and bolt, or adhesive. If desired, a body 112 formed of individual components may be weatherproofed using gaskets or silicone sealants. The body 112 can be fabricated in various shapes, such as straight, T-shaped and with 90 degree bends. For straight bodies, the length of the body may vary depending upon the environment the enclosure is to be installed. Generally, the body length can range between about 1 foot and about 10 feet. Preferably the length of the body is about 5 feet. The width of the body may vary depending upon the environment the enclosure is to be installed. Generally, the width of the body can range between about 1 foot and about 4 feet. Preferably, the width of the body is about 35 inches. The depth of the body may vary depending upon the environment the enclosure is to be installed. Generally, the depth of the body can range between about 6 inches and about 2 feet. Preferably, the depth of the body is about 16 inches.

The body 112 can be fabricated from composite materials, such as fiberglass and polyester resin, carbon fiber composites, and/or other composite materials capable of providing the structural integrity to protect cables within the enclosure 110, and to withstand loads created by individuals walking on the enclosure 110 or by vehicles riding over the enclosure 110. As an example, the body can withstand loads of at least 22,000 lbs. The sidewalls 116 and 122 of the body 112 preferably include at least a portion with a corrugated construction to provide added strength to the sidewalls. Each end of sidewall 116 includes flanges 118, 124 that provide a flat surface to engage flanges on another enclosure, or termination point, to permit coupling a plurality of enclosures in an abutting relationship. Each end of sidewall 122 includes a flange 124 that provides a flat surface to engage a flange on another enclosure, or termination point, also to permit coupling a plurality of enclosures in an abutting relationship.

The cover assembly 130 includes a pair of cover rails 132 and 134, and one or more covers 140. Cover rails 132 and 134 are configured and dimensioned to support covers 140. As such, the cover rails preferably include ledges 132a and 134a upon which the cover can rest. Cover rail 132 is molded into or otherwise secured to a top portion of sidewall 116 of body 112, and cover rail 134 is molded into or otherwise secured to a top portion of sidewall 122 of body 112. The cover rails 132 and 134 are configured to support the one or more covers 140. The cover rails 132, 134 and one or more covers 140 can be made of reinforced concrete, polymer concrete, including polymer concrete sandwiched between layers of fiberglass, various plastics or other materials capable of providing the structural integrity to protect cables within the enclosure 110, and to withstand loads created by individuals walking on the enclosure 110 or by vehicles riding over the enclosure 110. Fiberglass reinforcement 37 (similarly shown in FIG. 5) made be embedded within each cover rail 132 and 134 to extend along an inner region of the main body of the cover rail and along the ledge to provide additional strength to the ledge 132a or 134a. In some embodiments, covers 140 are covered on top portions with a grit surface diamond plate finish. Lift handles 150 are positioned at either end of each cover 140 to enable easier lifting for placement and removal of the covers 140. In some embodiments, lift handles 150 are mounted flush with a top surface of the covers 140. Lift handles 150 are illustrated in greater detail in FIG. 11.

The cover assembly 130 may also include one or more cover struts 138. The cover struts 138 can be positioned within strut rests 132b in cover rail 132, and strut rests 134b in cover rail 134. More specifically, each cover strut 138 is configured to extend across the body 112 from cover rail 132 on sidewall 116 to cover rail 134 on sidewall 122 so that one end of the cover strut rests within strut rest 132a and the other end of the cover strut rests within strut rest 134a. The cover struts 138 are provided to support the one or more covers 140, and can be made of steel, galvanized steel or other suitable material capable of supporting one or more covers 140 and loads applied to the covers. The cover struts 38 can also provide additional support to the sidewalls 116 and 122 of the body 112 to prevent the sidewalls from collapsing inwardly. The cover struts 138 can also provide additional support to the sidewalls 116 and 122 of the body 112 to prevent the sidewalls from spreading apart. More specifically, the ledge (e.g., ledge 134a) of a cover rail (e.g., cover rail 134) includes a strut rest (e.g., strut rest 134b) in which an end of the cover strut 138 rests or sits as described above. Extending from the strut rest is a pin 35 (similarly shown in FIG. 6) that fits within an aperture 138a in cover strut 138. The pin 35 is provided to prevent movement of the sidewall relative to the cover strut 138 to help prevent the sidewalls 116 and 122 from spreading apart as well as collapsing inward.

To fabricate the enclosure 110, fiberglass is placed on a mold shaped to form the body 112 with a base 114 and sidewalls 116 and 122. The fiberglass is then impregnated (also known as "wet out") with resin, e.g., polyester resin. The top portion of each sidewall 116 and 122 that is to be cast inside the polymer concrete cover rails 132 and 134, respectively, are designed so as to prevent the top portion of the sidewall and the cover rail from separating after being cast together by scarifying the top of the sidewalls. Once the body 112 is fabricated, the body is then placed in another mold to make the cover rails 132 and 134. As noted above, the cover rails 132 and 134 are preferably made of polymer concrete, which in this exemplary embodiment, consists of three different aggregates, e.g., rock, sand and calcium and a polyester resin. The polymer concrete is poured into the mold such that the top portion of sidewall 116 and sidewall 122 are embedded (or set) in the wet polymer concrete mix. Once the polymer concrete cures, the body and cover rails are removed from the mold, and cleaned for shipment. The sidewalls 116 and 122 shown in FIG. 10 differ primarily by being longer in total and having longer corrugated portions than the sidewalls 16 and 22 shown in FIG. 1, to better accommodate being sectioned around turns.

Figure 11:
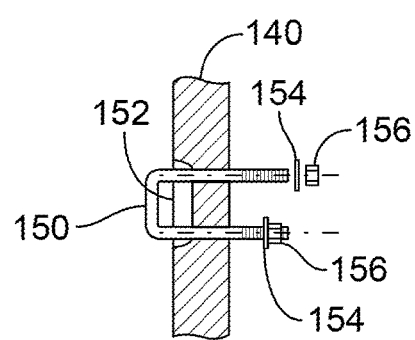
FIG. 11 is a partial cross-section of a portion of a cover and lift handle that can be used to lift the underground cable enclosure.

FIG. 11 is a partial cross-section of a portion of a cover and lift handle that can be used to lift the underground cable enclosure according to the present disclosure. Two lift handles 150 are positioned at either end of each a cover 140 (as shown in FIG. 10) to enable easier lifting for placement and removal of the covers 140. In some embodiments, each lift handle 150 is formed by insertion of a U-shaped metal bolt into holes drilled into a recessed portion 152 of the cover 140 and are mounted flush with a top surface of the cover 140. The lift handle 150 is secured to the cover 140 by a washer 154 and a nut 156 fitted around each end of the U-bolt as shown.

It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. An underground cable enclosure, comprising:
   a body made of a composite material comprising fiberglass and polyester resin; and
   a cover assembly having at least one cover rail attached to at least a portion of the body, at least one cover strut and at least one cover that can rest on the at least one cover rail and the at least one cover strut,
   wherein the at least one cover rail and the at least one cover are made of polymer concrete and the at least a portion of the body is molded together with and embedded within the polymer concrete of the at least one cover rail.

2. The underground cable enclosure according to claim 1, wherein the body comprises:
   a base made of the composite material;
   a first sidewall made of the composite material and extending from the base; and
   a second sidewall made of the composite material and extending from the base.

3. The underground cable enclosure according to claim 2, wherein the first sidewall has a least a portion with a corrugated structure to increase the strength of the first sidewall.

4. The underground cable enclosure according to claim 2, wherein the second sidewall has a least a portion with a corrugated structure to increase the strength of the second sidewall.

5. The underground cable enclosure according to claim 1, wherein the cover assembly further comprises a recessed well and a U-shaped bolt positioned in the recessed well.

6. The underground cable enclosure according to claim 1, wherein the at least one cover rail includes a ledge to support the at least one cover strut and the at least one cover, and a fiberglass reinforcement element embedded within the polymer concrete of the at least one cover rail along the ledge.

7. An underground cable trough, comprising:
   a base made of a composite material comprising fiberglass and polyester resin;
   a first sidewall extending from the base and made of the composite material;
   a first cover rail made of polymer cement and attached to a top portion of the first sidewall, wherein the top portion of the first sidewall is molded together with and embedded within the polymer cement of the first cover rail;
   a second sidewall extending from the base and made of the composite material; and
   a second cover rail made of polymer cement and attached to a top portion of the second sidewall, wherein the top portion of the second sidewall is embedded within the polymer cement of the second cover rail;
   wherein proximal ends of said first and second sidewalls define a first open end and distal ends of said first and second sidewalls define a second open end.

8. The underground cable trough according to claim 7, further comprising at least one cover strut configured to extend from the first cover rail to the second cover rail.

9. The underground cable trough according to claim 8, wherein the at least one cover strut is made of steel.

10. The underground cable trough according to claim 7, further comprising a plurality of cover struts, wherein each cover strut is configured to extend from the first cover rail to the second cover rail.

11. The underground cable trough according to claim 10, wherein the plurality of cover struts are made of steel.

12. The underground cable trough according to claim 7, wherein the first sidewall has a least a portion with a corrugated structure to increase the strength of the first sidewall.

13. The underground cable trough according to claim 7, wherein the second sidewall has a least a portion with a corrugated structure to increase the strength of the second sidewall.

14. The underground cable trough according to claim 7, wherein the first cover rail and the second cover rail are made of polymer concrete.

15. The underground cable trough according to claim 7, wherein each of the first and second cover rails further include a fiberglass reinforcement element embedded within the polymer cement.

16. An underground cable enclosure, comprising:
   a body made of a composite material comprising fiberglass and polyester resin; and
   a cover assembly having at least one cover rail attached to at least a portion of the body and at least one cover that can rest on the at least one cover rail, wherein the at least one cover rail and the at least one cover are made of polymer concrete,
   wherein the at least a portion of the body is molded together with and embedded within the polymer concrete of the at least one cover rail.

17. The underground cable enclosure according to claim 16, wherein the cover assembly further comprises at least one cover strut that can be extended across the body such that the at least one cover can rest upon the at least one cover strut.

18. The underground cable enclosure according to claim 16, wherein the body comprises:
   a base made of the composite material;
   a first sidewall made of the composite material and extending from the base; and
   a second sidewall made of the composite material and extending from the base.

19. The underground cable enclosure according to claim 18, wherein the first sidewall has a least a portion with a corrugated structure to increase the strength of the first sidewall.

20. The underground cable enclosure according to claim 18, wherein the second sidewall has a least a portion with a corrugated structure to increase the strength of the second sidewall.

* * * * *